United States Patent [19]
Cohen

[11] Patent Number: 6,008,997
[45] Date of Patent: Dec. 28, 1999

[54] SERIES RESONANT CONVERTER WITH INHERENT SHORT CIRCUIT PROTECTION

[75] Inventor: Isaac Cohen, Dix Hill, N.Y.

[73] Assignee: Lambda Electronics Incorporated, Melville, N.Y.

[21] Appl. No.: 09/274,436

[22] Filed: Mar. 22, 1999

Related U.S. Application Data
[60] Provisional application No. 60/108,450, Nov. 13, 1998.

[51] Int. Cl.[6] .......................................................... H02J 1/00
[52] U.S. Cl. .............................................. 363/15; 363/132
[58] Field of Search .............................. 363/17, 131, 132, 363/16, 15

[56] References Cited

U.S. PATENT DOCUMENTS

5,920,473  7/1999  Sturgeon ................................. 363/132

OTHER PUBLICATIONS

A Stable Load–Invariant High–Frequency SCR Series Resonant Inverter for Radar Transmitter Applications (Robert C. Cole, International Telephone and Telegraph, Gilfillen, Inc.) Dec. 1978, pp. 14–18.

2800 Watt Series Inverter DC Power Supply (D. L. Cronin, Electric Power Processing Dept., Redondo, Beach, CA) PCSC, Dec. 1971 pp. 117–123.

*Primary Examiner*—Shawn Riley
*Attorney, Agent, or Firm*—David Barron; Jules Jay Morris; Terrence Martin

[57] ABSTRACT

A series resonant circuit converts a DC input to an AC output. The circuit includes first and second series circuits connected across the DC input, but in opposite polarities. Each series circuit includes a switch, a transformer primary and a capacitor. Also within each series circuit, a diode is connected across the combination of the switch and transformer primary to provide limiting. The transformer primaries are connected together so that the switches are effectively in series. Singular and multiple transformer cores may be used in connection with singular and multiple secondaries to provide the AC output.

32 Claims, 3 Drawing Sheets

US 6,008,997

SERIES RESONANT CONVERTER WITH INHERENT SHORT CIRCUIT PROTECTION

This patent application is related to co-pending U.S. Provisional Patent Application entitled "Series Resonant Circuit with Inherent Short Circuit Protection" filed on Nov. 13, 1998, Ser. No. 60/108,450 which is hereby incorporated by reference herein in its entirety.

BACKGROUND OF THE INVENTION

Series resonant circuits are widely used in conjunction with electronic switching devices to perform DC/DC power conversion.

Such circuits are generally called "series resonant converters" and are susceptible to destruction in case of overloads or short circuits, particularly when operating at their resonant frequency.

SUMMARY OF THE INVENTION

The series resonant circuit introduced here is capable of operating into a short circuit even if the frequency of operation is equal to the resonant frequency.

Furthermore, by adjusting the switching frequency of the converter to values other (lower and higher) than its resonant frequency, zero current switching can be maintained at all load/line conditions so switching losses can be minimized.

Briefly described, in a first aspect, the present invention includes a circuit used to convert a DC voltage into an AC voltage and has first and second series circuits and a transformer. The series circuits are connected across a DC input and each include a switch, a transformer primary and a capacitor. Also, in each series circuit, a diode is connected across the series combination of the switch and transformer primary.

A connection is made between the transformer primaries of the series circuits such that the switches are connected in series. Moreover, a transfer secondary is magnetically coupled to at least one of the transformer primaries and provides the AC output.

As an enhancement, the series circuits may be connected in an order of the switch, the transformer primary and the capacitor. As a further enhancement, the series circuits are connected across the DC input in opposite polarities.

There are several embodiments regarding the connection of the transformer primaries and secondaries. In one embodiment, the transformer primaries and the secondary are all magnetically coupled to a common transformer core. In other embodiments, multiple transformer secondaries may be on the transformer core, and the transformer secondaries may be electrically connected (for example, in series or parallel).

In further embodiments, the first transformer primary and the second transformer primary may be coupled to magnetically separate transformer cores. On each of the cores, there may be, for example, separate secondaries which are optionally electrically connected to each other (for example, in series or parallel).

As a further enhancement, a rectifier circuit may be connected to the transformer secondary for conversion of the AC voltage output back to a DC voltage. Optionally, a filter/storage capacitor may be added in parallel with the output of the rectifier circuit.

DETAILED DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

Figure 1:
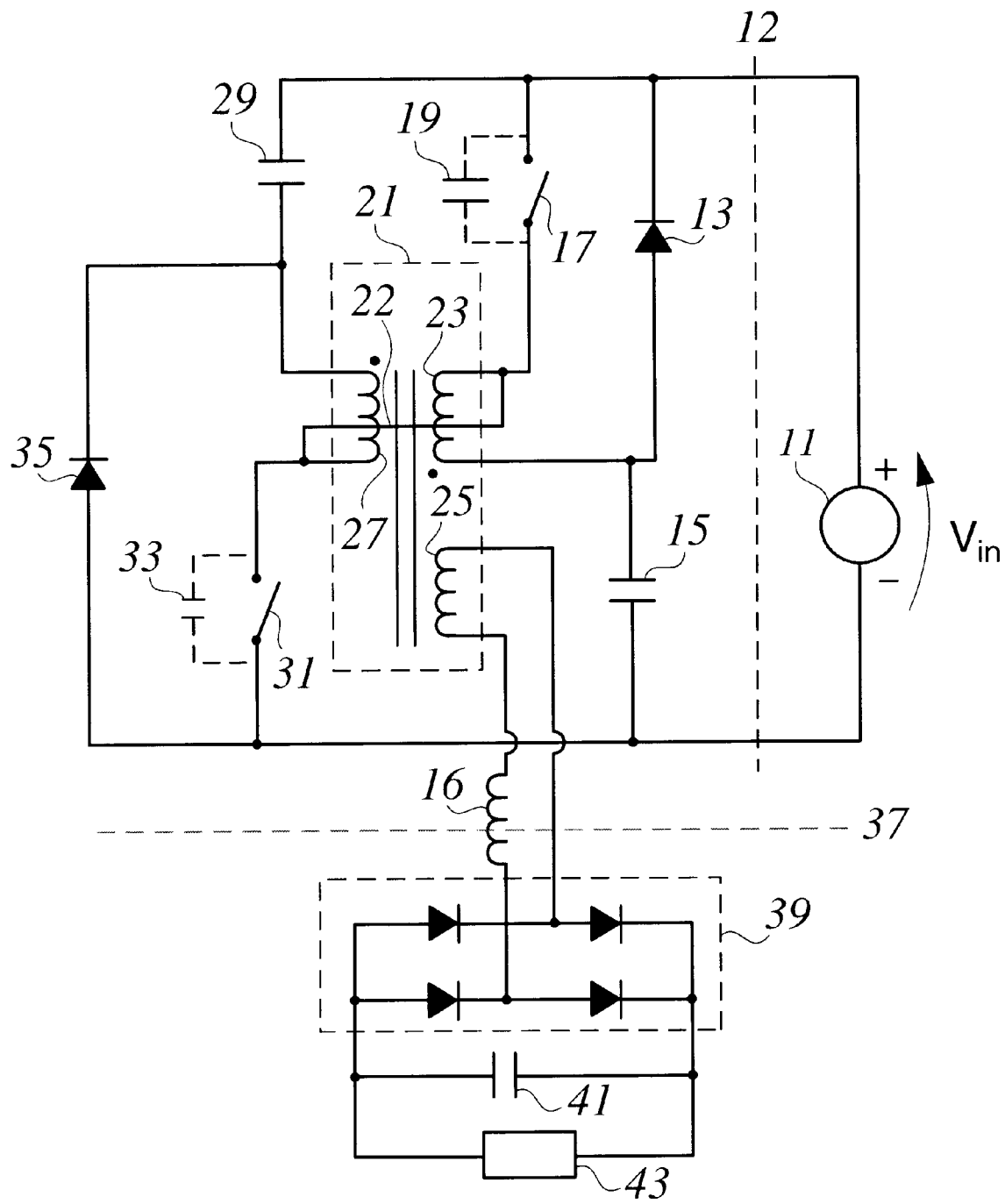
FIG. 1 is a schematic diagram of a series resonant circuit in accordance with one embodiment of the present invention.

Turning to FIG. 1, a DC voltage source 11 powers the series resonant inverter circuit described herein, and is connected to a DC input 12 thereof. Connected across DC input 12 is a first series circuit including a switch 17, a transformer primary 23 (of a transformer 21) and a capacitor 15. A diode 13 is connected in parallel with the series combination of switch 17 and primary 23, and provides limiting as described hereinbelow. A similar second series circuit is also connected across the DC input and includes a switch 31, and primary 27 and a capacitor 29. A diode 35 is connected across the series combination of switch 31 and primary 27 to provide limiting. Capacitors 33 and 19 represent the inherent capacitance of switches 31 and 17, respectively. Windings 23 and 27 are connected by connection 22.

Switches 31 and 17 may be any available, or future developed technology which may include, for example, bipolar and field-effect transistors, electromechanical or micromachined switches and other switching technology such as SCRs, IGBT's, etc. A control circuit operates the switches in accordance with the description hereinbelow, and is not shown. However, construction of such control circuits are well known in the art.

An inductor 16 is shown as part of the inverter circuit and is part of the resonant circuit. This inductance represents the effective series inductance of transformer 21 and any additional inductive elements that may be connected with any of the transformer windings for the purposes of tuning the resonant circuit to a particular frequency or obtaining a particular characteristic impedence. Therefore, inductor 16 may not exist as a discrete element in the circuit if not necessary.

Secondary winding 25 provides an AC output 37 of the inverter circuit. In the example of FIG. 1, a rectifier 39 and a filter capacitor 41 convert the AC output of the inverter circuit to DC and energize a load 43.

Operationally, with reference to FIG. 1, switches 31 and 17 are turned on and off consecutively at a frequency equal to the resonant frequency of the resonant circuit consisting of capacitors 15 and 29 in parallel and inductor 16 in series.

A small dead time is left between the conduction periods of the switches so cross-conduction is avoided. In addition, the dead time may be selected so the magnetizing currents of transformer 21 can discharge the snubbing capacitances 33 and 19 so the voltage on the switches is zero before the switches are turned on or off. As a result of the dead time, switches 31 and 17 will generally be on with a duty cycle of slightly less than 50%. For simplicity of description herein, we will assume that the duty cycle is 50%.

Figure 3:
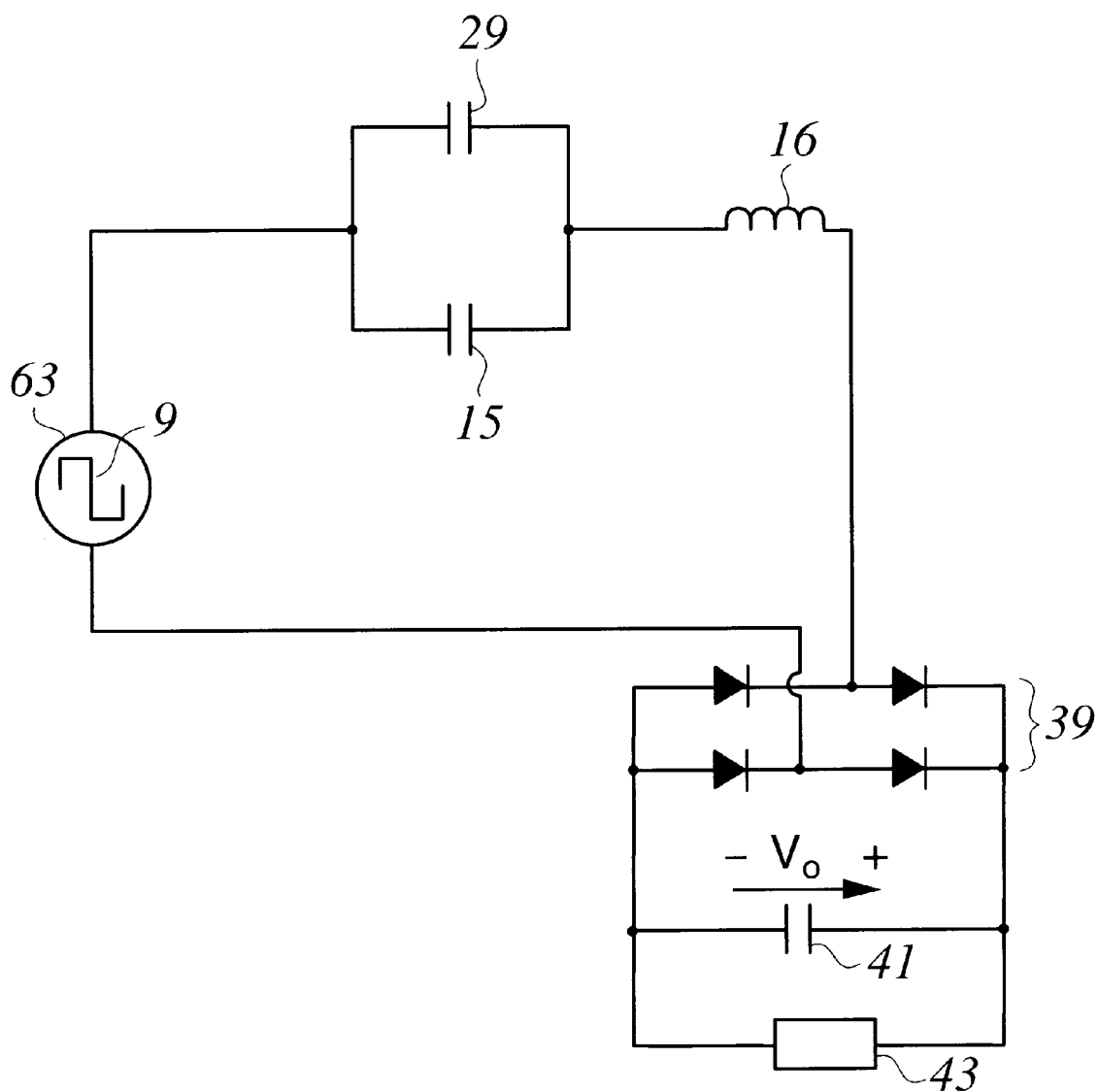
FIG. 3 is a schematic diagram of a theoretical represenation of the circuit of FIG. 1 in accordance with one particular operational mode pursuant to the present invention.

If the circuit is operated as above and the transformer has unity turns ratio between all its windings, the converter of the present invention can be theoretically represented by the circuit of FIG. 3.

In this circuit, a symmetrical square wave generator 63, whose output peak to peak value is equal to the DC value of the input voltage source 11 of FIG. 1, is applied to the resonant circuit and bridge rectifier 39.

At steady state, the voltage across filter capacitor 41 and load 43 will settle to a value equal to half the input voltage.

The source 63 will deliver a sinusoidal current whose rectified average value will be equal to the output DC current absorbed by load 43.

If the resistance of load 43 is decreased, the output current will increase monotonically and will reach eventually destructive values.

The increase of the current is limited by the addition of diodes 13 and 35 of FIG. 1.

These diodes will limit the peak voltage that develops on the resonant capacitors to a value equal to the input voltage Vin, effectively stopping the resonance of inductor 16 and capacitors 15 and 29.

As a result, even thought the output current continues to increase as the load resistance is decreased, the rate of increase is greatly reduced and the value of the current under a short circuit condition is limited to a finite value. We define this value as the "natural" short circuit current of the converter.

An important property of the converter is that its output voltage is unaffected by variations in the load current as long as the current is below the values that causes diodes 13 and 35 to conduct, or in other words, the peak voltage on the resonant capacitors 29 and 15 is lower than the input voltage Vin.

We define the value of the output current that brings diodes 13 of 35 to the threshold of conduction as the nominal output current.

The nominal current value is given by:

$$Inom = \frac{Vin}{\pi} \cdot \frac{1}{\sqrt{L_R C_R}}$$

Where $C_R$ is the sum of the values of capacitors 15 and 29 and $L_R$ is the value of the resonant inductor 16.

It is important to note that for output current values below nominal, the turn on and off of switches 31 and 17 occur when the resonant current crosses zero, so switching losses in these devices are negligible.

As the output current increases above the nominal value, the OFF transitions will occur at ever increasing current values and the switching losses will increase.

This problem can be eliminated by monitoring the resonant circuit current and allowing the switching transitions to occurs when the current is zero or near zero.

The outcome of this control strategy is that the switches and rectifiers switch at zero current and losses, stresses and electrical noise generation are reduced.

Altering the switching frequency above or below resonance can also be used to regulate the output voltage of the converter against changes in the input voltage and output load current.

Since the leakage inductance between the primaries 23, 27 and the secondary 25 of transformer 21 are part of the resonant inductance 16, it is desirable to optimize these inductances.

Figure 2:
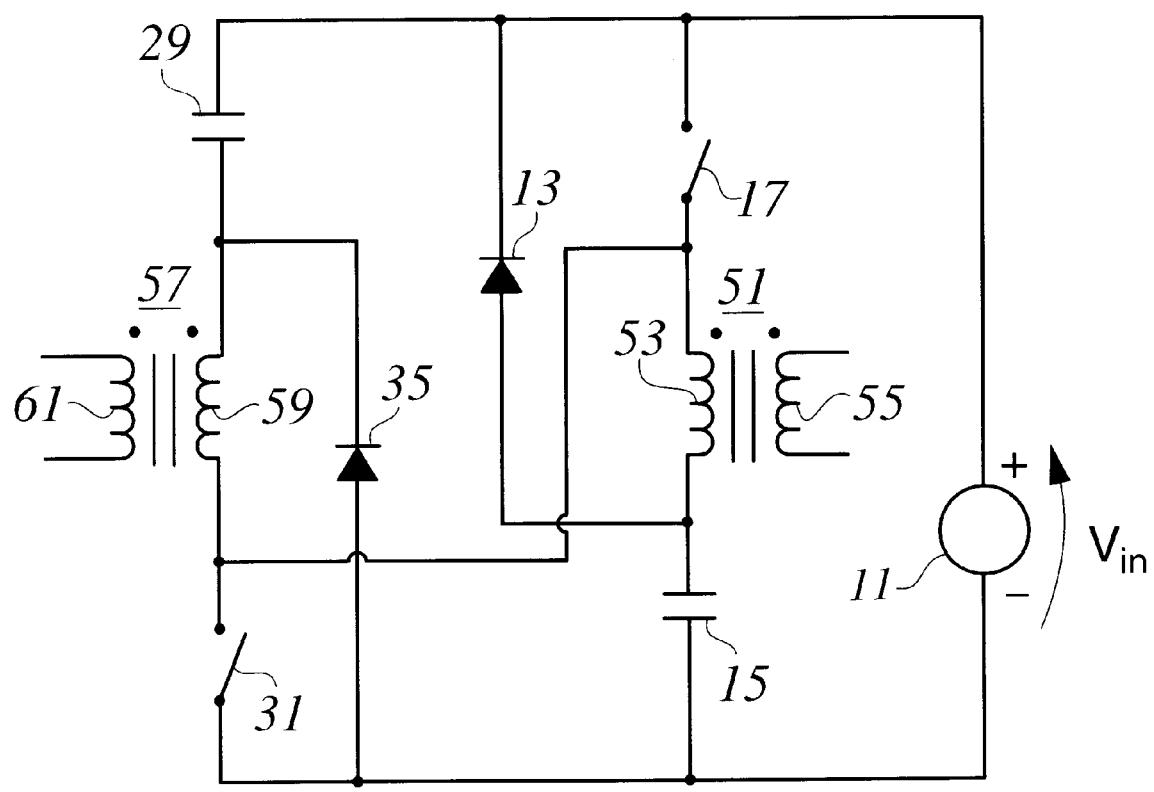
FIG. 2 is a schematic of a series resonant circuit in accordance with another embodiment of the present invention.

For this and the purpose of reducing the copper loss in transformer 21, secondary 25 may be replaced by a number of secondaries that may be connected in series, parallel or center tap configuration that will facilitate the rectification of the voltage generated by the converter. In a similar regard, it may also be advantageous to replace transformer 21 by two transformers 51 and 57 (FIG. 2).

These transformers may have one or more secondaries that can be combined in various ways to facilitate rectification.

Furthermore, synchronous rectifiers can be substituted for the rectifier diodes and can advantageously be driven by a signal whose timing is identical to the drive signal for the switches. Since the circuit will be generally operated in the discontinuous mode, there will be no danger of cross conduction in the rectifiers or reverse recovery phenomena associated with conduction of the body diodes.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

I claim:

1. A circuit to convert a DC input to an AC output comprising:
    a first series circuit connected across said DC input and including a first switch, a first transformer primary and a first capacitor, and further including a first diode connected across the series combination of said first switch and said first transformer primary;
    a second series circuit connected across said DC input and including a second switch, a second transformer primary and a second capacitor, and further including a second diode connected across the series combination of said second switch and said second transformer primary;
    a connection between said transformer primaries such that said first switch is connected in series with said second switch; and
    a transformer secondary magnetically coupled to at least one of said transformer primaries and providing said AC output.

2. The circuit of claim 1, wherein said first series circuit is connected in an order of said first switch, said first transformer primary and said first capacitor across said DC input.

3. The circuit of claim 1, wherein said DC input has a positive node and a negative node, and wherein said positive node is connected to a first terminal of said first switch and said negative node is connected to a first terminal of said first capacitor.

4. The circuit of claim 3, wherein said positive node is connected to a cathode of said first diode.

5. The circuit of claim 2, wherein said second series circuit is connected in an order of said second switch, said second transformer primary and said second capacitor across said DC input.

6. The circuit of claim 5, wherein said DC input has a positive node and a negative node, and wherein said positive node is connected to a first terminal of said first switch and a first terminal of said second capacitor, and wherein said negative node is connected to a first terminal of said first capacitor and a first terminal of said second switch.

7. The circuit of claim 6, wherein said positive node is connected to a cathode of said first diode, and wherein said negative node is connected to an anode of said second diode.

8. The circuit of claim 1, wherein said first transformer primary, said second transformer primary and said secondary are magnetically coupled to a common transformer core.

9. The circuit of claim 8, wherein said transformer secondary comprises a first secondary, and wherein said circuit further includes a second secondary magnetically coupled to said transformer core and electrically connected with said first secondary.

10. The circuit of claim 1, wherein said first transformer primary and said second transformer primary are coupled to magnetically separate transformer cores, said transformer secondary being magnetically coupled to at least one of said separate transformer cores.

11. The circuit of claim 10, wherein said transformer secondary comprises a first secondary, and wherein said circuit further includes a second secondary magnetically coupled to another of said separate transformer cores than said first secondary.

12. The circuit of claim 11, wherein said first and second transformer secondaries are electrically connected.

13. The circuit of claim 1, further including a rectifier circuit connected to said transformer secondary.

14. The circuit of claim 13, wherein said rectifier circuit includes an input connected to said transformer secondary, and an output connected to a filter capacitor.

15. The circuit of claim 13, wherein said rectifier circuit includes synchronous rectifiers.

16. The circuit of claim 15, wherein said synchronous rectifiers are driven by signals having timing substantially identical to signals driving said first and second switches.

17. A circuit to convert a DC voltage to an AC voltage comprising:
   a DC voltage source producing said DC voltage at a DC output thereof;
   a first series circuit connected across said DC output and including a first switch, a first transformer primary and a first capacitor, and further including a first diode connected across the series combination of said first switch and said first transformer primary;
   a second series circuit connected across said DC output and including a second switch, a second transformer primary and a second capacitor, and further including a second diode connected across the series combination of said second switch and said second transformer primary;
   a connection between said transformer primaries such that said first switch is connected in series with said second switch; and
   a transformer secondary magnetically coupled to at least one of said transformer primaries and providing said AC voltage.

18. The circuit of claim 17, wherein said first series circuit is connected in an order of said first switch, said first transformer primary and said first capacitor across said DC output.

19. The circuit of claim 18, wherein said DC output has a positive node and a negative node, and wherein said positive node is connected to a first terminal of said first switch and said negative node is connected to a first terminal of said first capacitor.

20. The circuit of claim 19, wherein said positive node is connected to a cathode of said first diode.

21. The circuit of claim 18, wherein said second series circuit is connected in an order of said second switch, said second transformer primary and said second capacitor across said DC output.

22. The circuit of claim 21, wherein said DC output has a positive node and a negative node, and wherein said positive node is connected to a first terminal of said first switch and a first terminal of said second capacitor, and wherein said negative node is connected to a first terminal of said first capacitor and a first terminal of said second switch.

23. The circuit of claim 22, wherein said positive node is connected to a cathode of said first diode, and wherein said negative node is connected to an anode of said second diode.

24. The circuit of claim 17, wherein said first transformer primary, said second transformer primary and said secondary are magnetically coupled to a common transformer core.

25. The circuit of claim 24, wherein said transformer secondary comprises a first secondary, and wherein said circuit further includes a second secondary magnetically coupled to said transformer core and electrically connected with said first secondary.

26. The circuit of claim 17, wherein said first transformer primary and said second transformer primary are coupled to magnetically separate transformer cores, said transformer secondary being magnetically coupled to at least one of said separate transformer cores.

27. The circuit of claim 26, wherein said transformer secondary comprises a first secondary, and wherein said circuit further includes a second secondary magnetically coupled to another of said separate transformer cores than said first secondary.

28. The circuit of claim 27, wherein said first and second transformer secondaries are electrically connected.

29. The circuit of claim 17, further including a rectifier circuit connected to said transformer secondary.

30. The circuit of claim 29, wherein said rectifier circuit includes an input connected to said transformer secondary, and an output connected to a filter capacitor.

31. The circuit of claim 29, wherein said rectifier circuit includes synchronous rectifiers.

32. The circuit of claim 31, wherein said synchronous rectifiers are driven by signals having timing substantially identical to signals driving said first and second switches.

* * * * *